US012731810B2

(12) United States Patent
Zhang

(10) Patent No.: US 12,731,810 B2
(45) Date of Patent: Sep. 8, 2026

(54) ELECTROCHEMICAL DEVICE AND ELECTRONIC DEVICE

(71) Applicant: Ningde Amperex Technology Limited, Ningde (CN)

(72) Inventor: Yuanjie Zhang, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 733 days.

(21) Appl. No.: 18/188,687

(22) Filed: Mar. 23, 2023

(65) Prior Publication Data

US 2023/0307690 A1 Sep. 28, 2023

(30) Foreign Application Priority Data

Mar. 28, 2022 (CN) ........................ 202210310406.4

(51) Int. Cl.
*H01M 10/04* (2006.01)
*H01M 50/105* (2021.01)
(Continued)

(52) U.S. Cl.
CPC ..... *H01M 10/0431* (2013.01); *H01M 50/105* (2021.01); *H01M 50/534* (2021.01); *H01M 50/538* (2021.01)

(58) Field of Classification Search
CPC ............ H01M 50/538; H01M 50/105; H01M 50/534; H01M 10/0431
See application file for complete search history.

(56) References Cited

U.S. PATENT DOCUMENTS

2004/0045597 A1* 3/2004 Kimijima .......... H01M 10/0431 136/251
2013/0157096 A1* 6/2013 Nakagiri ........... H01M 10/0587 429/94
(Continued)

FOREIGN PATENT DOCUMENTS

CN 211350883 U 8/2020
CN 113728493 A 11/2021
(Continued)

OTHER PUBLICATIONS

Extended Search Report issued on Aug. 10, 2023, in corresponding European Application No. 23163416.3, 7 pages.
(Continued)

*Primary Examiner* — Alix E Eggerding
(74) *Attorney, Agent, or Firm* — Maier & Maier, PLLC

(57) ABSTRACT

An electrochemical device includes a packaging bag, an electrode assembly, and a binder. The electrode assembly is disposed in the packaging bag. The binder is configured to bond the electrode assembly to the packaging bag. The binder includes a first bonding layer, a substrate layer, and a second bonding layer that are stacked in sequence. The first bonding layer adheres to a surface of the electrode assembly. The second bonding layer adheres to a surface that is of the packaging bag and that is close to the electrode assembly. A peel strength between the first bonding layer and the electrode assembly is $F_1$, a peel strength between the second bonding layer and the packaging bag is $F_2$, and the peel strengths satisfy 50 N/m$\leq F_1 \leq$1000 N/m and $1 \leq F_1/F_2 \leq 10$. A tensile strength of the substrate layer is 100 MPa to 2000 MPa.

20 Claims, 4 Drawing Sheets

(51) Int. Cl.
*H01M 50/534* (2021.01)
*H01M 50/538* (2021.01)

(56) References Cited

U.S. PATENT DOCUMENTS

| | | | | |
|---|---|---|---|---|
| 2015/0136317 | A1* | 5/2015 | Yamada | B29C 65/1635 156/60 |
| 2017/0346130 | A1* | 11/2017 | Maeda | H01M 10/0525 |
| 2022/0059909 | A1* | 2/2022 | Lee | H04M 1/0262 |

FOREIGN PATENT DOCUMENTS

| | | | |
|---|---|---|---|
| CN | 113875083 | A | 12/2021 |
| CN | 114122312 | A | 3/2022 |
| CN | 114127998 | A | 3/2022 |
| KR | 1020200105586 | A | 9/2020 |
| WO | 2014178590 | A1 | 11/2014 |
| WO | 2021206381 | A1 | 10/2021 |
| WO | 2022000226 | A1 | 1/2022 |

OTHER PUBLICATIONS

Office Action issued on Dec. 26, 2023, in corresponding Chinese Application No. 202210310406.4, 16 pages.

Zhan, “A Complete Guide to the Production of Modern Small Chemical Commodities”, Hunan University Press, Aug. 31, 1999, 5 pages.

* cited by examiner

ELECTROCHEMICAL DEVICE AND ELECTRONIC DEVICE

CROSS-REFERENCE TO RELATED APPLICATION

This application claims the priority from the Chinese Patent Application No. 202210310406.4, filed on Mar. 28, 2022, the content of which is incorporated herein by reference in its entirety.

TECHNICAL FIELD

This application relates to the technical field of electrochemistry, and in particular, to an electrochemical device and an electronic device.

BACKGROUND

By virtue of a high energy storage density, a high open circuit voltage, a low self-discharge rate, a long cycle life, high safety, and other merits, lithium-ion batteries are widely used in various fields such as portable electrical energy storage, electronic devices, and electric vehicles. In a process of rapid development of the lithium-ion batteries, higher requirements are put forward on the overall performance of the lithium-ion batteries.

In practice, a lithium-ion battery may be used in special scenarios such as being extruded by an external force extrusion and being impacted and punctured by a foreign object. In such scenarios, the lithium-ion battery is structurally disrupted, severely short circuited or heated in a local region, or incurs other problems, and consequently, becomes thermally runaway or even catches fire and fails, thereby affecting the safety performance of the lithium-ion battery. Therefore, how to enhance the safety performance of the lithium-ion battery has become an urgent problem to be solved.

SUMMARY

An objective of this application is to provide an electrochemical device and an electronic device to improve safety performance of the electrochemical device.

A first aspect of this application provides an electrochemical device. The electrochemical device includes a packaging bag, an electrode assembly, and a binder. The electrode assembly is disposed in the packaging bag. The binder is configured to bond the electrode assembly to the packaging bag. The binder includes a first bonding layer, a substrate layer, and a second bonding layer that are stacked in sequence. The first bonding layer adheres to a surface of the electrode assembly. The second bonding layer adheres to a surface that is of the packaging bag and that is close to the electrode assembly. A peel strength between the first bonding layer and the electrode assembly is $F_1$, a peel strength between the second bonding layer and the packaging bag is $F_2$, and the peel strengths satisfy 50 N/m$\le F_1 \le$1000 N/m and $1 \le F_1/F_2 \le 10$. A tensile strength of the substrate layer is 100 MPa to 2000 MPa. Controlling the peel strengths of the first bonding layer and the second bonding layer and the tensile strength of the substrate layer to fall within the above ranges makes it easier for the packaging bag, the electrode assembly, and the binder to form a whole that is consistent in mechanical properties, and generate synergy to improve the resistance-to-compression of the electrochemical device, and in turn, improve the safety performance of the electrochemical device.

In some embodiments of this application, 50 N/m$\le F_2 \le$800 N/m. Controlling the peel strength $F_2$ between the second bonding layer and the packaging bag to fall within the above range makes it easier for the packaging bag, the electrode assembly, and the binder to form a whole that is consistent in mechanical properties, and generate synergy to improve the resistance-to-compression of the electrochemical device, and in turn, improve the safety performance of the electrochemical device.

In some embodiments of this application, a thickness of the first bonding layer is 0.5 μm to 50 μm, and a thickness of the second bonding layer is 0.5 μm to 50 μm. Controlling the thicknesses of the first bonding layer and the second bonding layer to fall within the above ranges improves the safety performance of the electrochemical device without affecting other performance indicators of the electrochemical device.

In some embodiments of this application, a material of the first bonding layer and a material of the second bonding layer each independently include at least one of an acrylic compound, an acrylate compound, a phosphate compound, a polyurethane compound, rosin resin, terpene resin, phenolic resin, petroleum resin, epoxy resin, a vinyl acetate compound, a polyvinyl acetal compound, a polyamide compound, a vulcanized silicone rubber, furan resin, formaldehyde resin, a polyimide compound, urea-formaldehyde resin, an acetate compound, styrene, microcrystalline wax, or poly(styrene-co-$C_2$ to $C_5$ olefin). With the above compounds selected, the peel strength $F_1$ between the first bonding layer and the electrode assembly and the peel strength $F_2$ between the second bonding layer and the packaging bag can meet the requirements of this application, thereby improving the safety performance of the electrochemical device.

In some embodiments of this application, a thickness of the substrate layer is 1 μm to 50 μm. Controlling the thickness of the substrate layer to fall within the above range improves the safety performance of the electrochemical device without affecting other performance indicators of the electrochemical device.

In some embodiments of this application, a material of the substrate layer includes at least one of aluminum, stainless steel, a titanium alloy, nickel, or mica sheet. The substrate layer made of the above materials possesses good mechanical properties, thereby improving the resistance-to-compression of the electrochemical device, and in turn, improving the safety performance of the electrochemical device.

In some embodiments of this application, the electrode assembly is of a winding structure. The electrode assembly includes a tab. Along a thickness direction of the electrode assembly, the electrode assembly includes a first surface and a second surface. A distance from the tab to the first surface is $L_1$, a distance from the tab to the second surface is $L_2$, and the distances satisfy $L_1/L_2>1$. The first bonding layer adheres to the first surface. The obtained electrochemical device as a whole possesses good mechanical strength against extrusion, and the resistance-to-compression of the electrochemical device is improved, thereby improving the safety performance of the electrochemical device.

In some embodiments of this application, the electrode assembly includes a tab and an electrode plate. The electrode plate includes a connection region that connects the tab to the electrode plate. Along a thickness direction of the electrode assembly, an orthographic projection of the binder at least partly overlaps an orthographic projection of the connection region, thereby improving the safety performance of the electrochemical device.

In some embodiments of this application, an area of the orthographic projection of the binder is greater than or equal to an area of the orthographic projection of the connection region.

In some embodiments of this application, the tab is a negative tab. The negative tab is made of a material including at least one of copper, a copper alloy, nickel, a nickel alloy, or nickel-clad copper. The negative tab made of the above materials possesses good mechanical properties, thereby improving the safety performance of the electrochemical device.

A second aspect of this application provides an electronic device. The electronic device includes the electrochemical device according to any one of the foregoing implementation solutions. Due to the good safety performance of the electrochemical device according to this application, the electronic device according to this application possesses good safety performance.

This application provides an electrochemical device and an electronic device. The electrochemical device includes a packaging bag, an electrode assembly, and a binder. The electrode assembly is disposed in the packaging bag. The binder is configured to bond the electrode assembly to the packaging bag. The binder includes a first bonding layer, a substrate layer, and a second bonding layer that are stacked in sequence. The first bonding layer adheres to a surface of the electrode assembly. The second bonding layer adheres to a surface that is of the packaging bag and that is close to the electrode assembly. A peel strength between the first bonding layer and the electrode assembly is $F_1$, a peel strength between the second bonding layer and the packaging bag is $F_2$, and the peel strengths satisfy 50 N/m$\le F_1 \le$1000 N/m and $1 \le F_1/F_2 \le 10$. A tensile strength of the substrate layer is 100 MPa to 2000 MPa. Controlling the peel strengths of the first bonding layer and the second bonding layer and the tensile strength of the substrate layer to fall within the above ranges makes it easier for the packaging bag, the electrode assembly, and the binder to form a whole that is consistent in mechanical properties, and generate synergy to improve the resistance-to-compression of the electrochemical device, and in turn, improve the safety performance of the electrochemical device.

Definitely, a single embodiment of this application implemented does not necessarily achieve all of the foregoing advantages concurrently.

BRIEF DESCRIPTION OF DRAWINGS

To describe the technical solutions in some embodiments of this application more clearly, the following outlines the drawings to be used in the description of the embodiments. Evidently, the drawings outlined below merely illustrate some embodiments of this application, and a person of ordinary skill in the art may derive other embodiments based on the drawings.

DETAILED DESCRIPTION

The following describes the technical solutions in some embodiments of this application clearly in detail with reference to the drawings appended hereto. Evidently, the described embodiments are merely a part of but not all of the embodiments of this application. All other embodiments derived by a person of ordinary skill in the art based on the embodiments of this application without making any creative efforts still fall within the protection scope of this application.

It is hereby noted that in specific embodiments of this application, this application is construed by using a lithium-ion battery as an example of the electrochemical device, but the electrochemical device according to this application is not limited to the lithium-ion battery.

Figure 1:
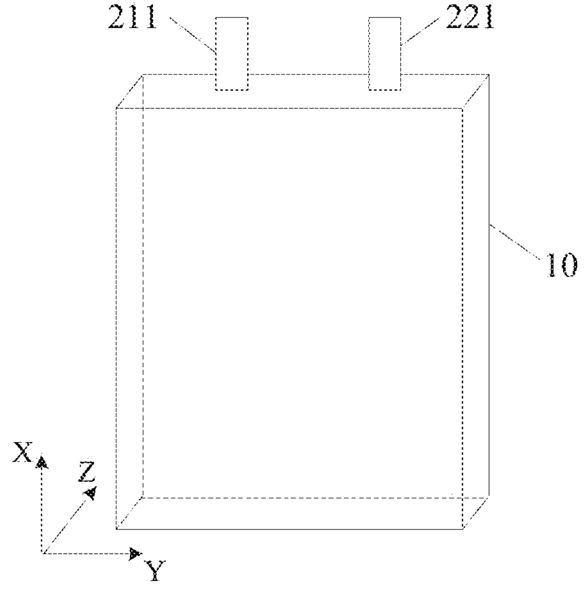
FIG. 1 is a schematic structural diagram of an electrochemical device according to an embodiment of this application.

As shown in FIG. 1, which illustrates an electrochemical device according to some embodiments of this application, an electrode assembly (not shown in the drawing) is disposed in a packaging bag 10. The electrode assembly includes a positive tab 211 and a negative tab 221. The positive tab 211 and the negative tab 221 protrude along a length direction of the electrochemical device. For ease of understanding, a three-dimensional rectangular coordinate system is created in which the length direction of the electrochemical device is an X direction, the width direction of the electrochemical device is a Y direction, and the thickness direction of the electrochemical device is a Z direction. The length direction of the electrode assembly is the same as the length direction (X direction) of the electrochemical device, the width direction of the electrode assembly is the same as the width direction (Y direction) of the electrochemical device, and the thickness direction of the electrode assembly is the same as the thickness direction (Z direction) of the electrochemical device. The thickness direction of the binder is the same as the thickness direction (Z direction) of the electrochemical device. The positive tab and negative tab described above are the positive tab and negative tab well known in the art, and are not limited in this application.

Figure 2:
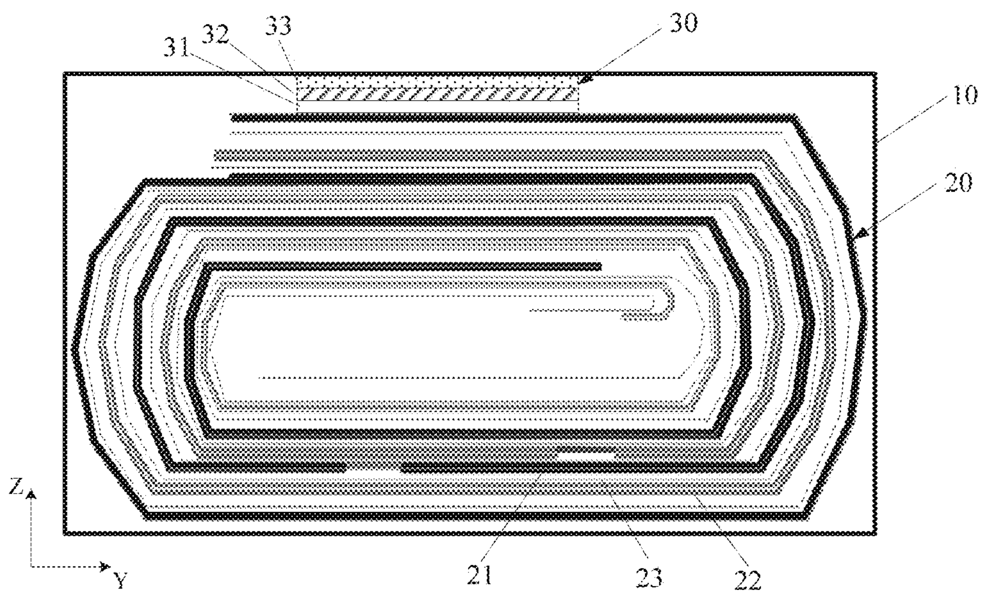
FIG. 2 is a schematic sectional view of an electrochemical device sectioned along a thickness direction of the electrochemical device according to an embodiment of this application.
Figure 3:
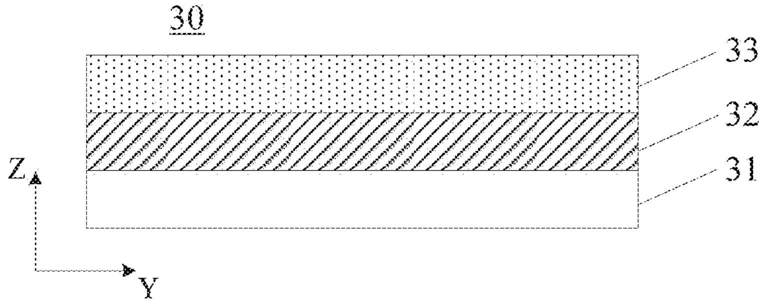
FIG. 3 is a schematic sectional view of a binder sectioned along a thickness direction of the binder according to an embodiment of this application.
Figure 4:
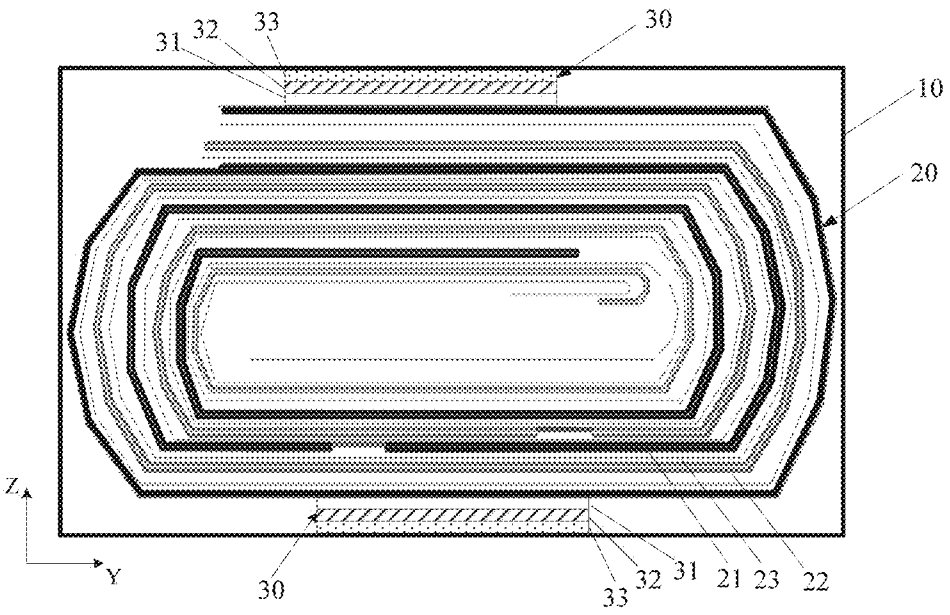
FIG. 4 is a schematic sectional view of an electrochemical device sectioned along a thickness direction of the electrochemical device according to another embodiment of this application.

A first aspect of this application provides an electrochemical device. As shown in FIG. 2 and FIG. 3, the electrochemical device includes a packaging bag 10, an electrode assembly 20, and a binder 30. The electrode assembly 20 is disposed in the packaging bag 10. The electrode assembly 20 includes a positive electrode plate 21, a negative electrode plate 22, and a separator 23. The binder 30 is configured to bond the electrode assembly 20 to the packaging bag 10. The binder 30 adheres to an outer surface of the electrode assembly 20 on one side along the thickness direction (Z direction) of the electrode assembly. The binder 30 includes a first bonding layer 31, a substrate layer 32, and a second bonding layer 33 that are stacked in sequence along the thickness direction (Z direction) of the binder. The first bonding layer 31 adheres to a surface of the electrode assembly 20. The second bonding layer 33 adheres to a surface that is of the packaging bag 10 and that is close to the electrode assembly 20. A peel strength between the first bonding layer 31 and the electrode assembly 20 is $F_1$, a peel strength between the second bonding layer 33 and the packaging bag 20 is $F_2$, and the peel strengths satisfy 50 N/m≤$F_1$≤1000 N/m and 1≤$F_1/F_2$≤10. A tensile strength 32 of the substrate layer is 100 MPa to 2000 MPa. As shown in FIG. 4, the binder 30 adheres to outer surfaces of the electrode assembly 20 on both sides along the thickness direction (Z direction) of the electrode assembly. For an illustrative purpose only, the Y direction in FIG. 3 is the width direction of the binder 30. Understandably, an adhesion position and an adhesion direction of the binder in the electrochemical device may be selected according to practical conditions.

Understandably, the binder may adhere to the outer surfaces on both sides of the electrode assembly along the thickness direction (Z direction) thereof and the outer surfaces of the electrode assembly on both sides along the width direction (Y direction) thereof. The adhesion positions and the quantity of the binders may be selected according to practical conditions. In this application, the positive electrode plate includes a positive current collector and a positive material layer disposed on a surface of the positive current collector in the thickness direction of the positive current collector (identical to the Z direction). The negative electrode plate includes a negative current collector and a negative material layer disposed on a surface of the negative current collector in the thickness direction of the negative current collector (identical to the Z direction). The outer surface of the electrode assembly means a surface close to the packaging bag. The outer surface of the electrode assembly may be formed by the positive current collector, the negative current collector, the negative material layer, or a separator. The electrode assembly and packaging bag described above are the electrode assembly and packaging bag well known in the art, and are not limited in this application.

For example, the peel strength $F_1$ between the first bonding layer and the electrode assembly may be 50 N/m, 100 N/m, 200 N/m, 300 N/m, 400 N/m, 500 N/m, 600 N/m, 700 N/m, 800 N/m, 900 N/m, 1000 N/m, or a value falling within a range formed by any two thereof. The value of the $F_1/F_2$ ratio may be 1, 2, 3, 4, 5, 6, 7, 8, 9, 10, or a value falling within a range formed by any two thereof. The tensile strength of the substrate layer may be 100 MPa, 200 MPa, 300 MPa, 400 MPa, 500 MPa, 600 MPa, 800 MPa, 1000 MPa, 1100 MPa, 1200 MPa, 1300 MPa, 1400 MPa, 1500 MPa, 1700 MPa, 2000 MPa, or a value falling within a range formed by any two thereof. When the peel strength $F_1$ between the first bonding layer and the electrode assembly is deficient (for example, less than 50 N/m), the peel strength between the first bonding layer and the electrode assembly is insufficient, and a breakage is prone to occur when an external force is exerted, thereby further impairing the peel strength, and in turn, impairing the safety performance of the electrochemical device. When the peel strength $F_1$ between the first bonding layer and the electrode assembly is excessive (for example, greater than 1000 N/m), the first bonding layer is rigidly bonded to the electrode assembly, thereby leading to failure of elastic deformation and failure of improving the resistance-to-compression of the electrochemical device. The value of the $F_1/F_2$ ratio, if unduly low (for example, less than 1) or unduly high (for example, greater than 10), is adverse to combining the packaging bag, the electrode assembly, and the binder into a whole that is consistent in mechanical properties, and therefore, is adverse to improving the safety performance of the electrochemical device. When the tensile strength of the substrate layer is deficient (for example, less than 100 MPa), the improvement in the safety performance of the electrochemical device is not significant. When the tensile strength of the substrate layer is excessive (for example, greater than 2000 MPa), the material of the substrate layer is more rigid but less ductile, so that the binder is more prone to generate scraps when extruded by an external force. The scraps tend to puncture the electrode assembly and result in a short circuit, thereby impairing the safety performance of the electrochemical device.

On the whole, controlling the values of $F_1$ and $F_1/F_2$ to fall within the above ranges makes it easier for the packaging bag, the electrode assembly, and the binder to form a whole that is consistent in mechanical properties, and generate synergy to improve the resistance-to-compression of the electrochemical device. The substrate layer of a tensile strength falling within the above range possesses good mechanical properties and malleability, and improves the resistance-to-compression and anti-drop performance of the electrochemical device, thereby improving the safety performance of the electrochemical device.

Figure 5:
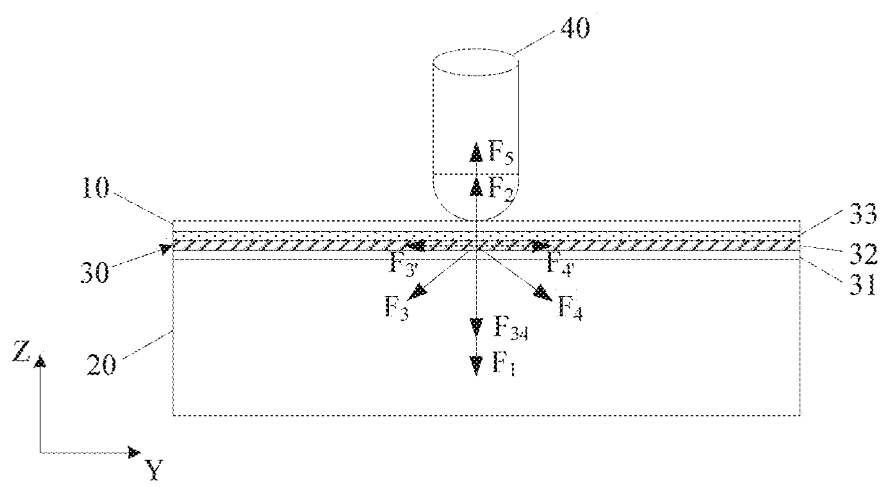
FIG. 5 is a local stress analysis diagram of an electrochemical device under action of a round-rod blunt nail according to an embodiment of this application.

Specifically, as shown in FIG. 5, which is a local stress analysis diagram of an electrochemical device under the action of a round-rod blunt nail 40, when the round-rod blunt nail 40 extrudes the electrochemical device downward, the downward forces that the binder 30 bears include: a peel strength $F_1$ between the first bonding layer 31 and the electrode assembly 20, and tangential forces $F_3$ and $F_4$ at an extrusion point of the head of the round-rod blunt nail 40; and the upward forces that the binder 30 bears include: a peel strength $F_2$ between the packaging bag 10 and the second bonding layer, and a support force $F_5$ of the electrochemical device for the binder 30. After the forces are decomposed, because the binder 30 is not displaced along the Y direction, component forces $F_3'$ and $F_4'$ obtained by decomposing $F_3$ and $F_4$ along the Y direction are equal. Because the binder 30 needs to adhere to the surface of the electrode assembly 20, a component force obtained by decomposing $F_3$ and $F_4$ along the Z direction is $F_{34}$. Normally, $F_{34}+F_1$ is greater than $F_5+F_2$. Being interaction forces, the support force $F_5$ and the vertical component force $F_{34}$ are equal.

Figure 6:
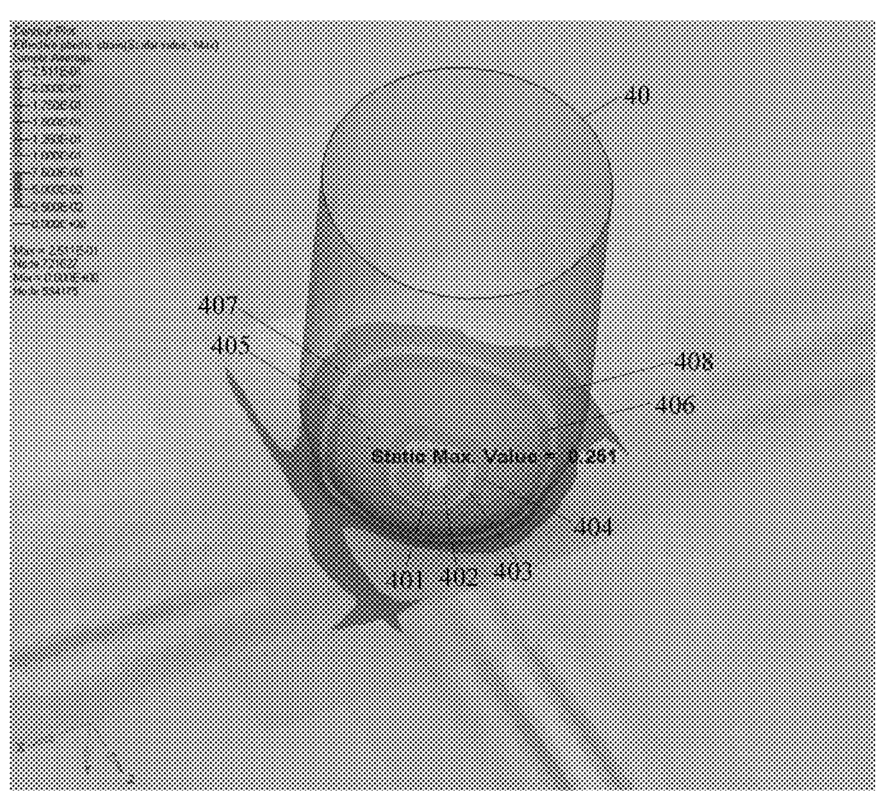
FIG. 6 is a simulation test diagram of the stress shown in FIG. 5.

In addition, with reference to a simulation test (as shown in FIG. 6), as can be seen from the drawing, when the round-rod blunt nail 40 squeezes the electrochemical device, the pressure at a region 405 is greater than the pressures at a region 401, region 402, region 403, region 404, region 406, region 407, and region 408. That is, the pressure generated by an arc edge of the head of the round-rod blunt nail is the largest, indicating that a tangential stress of the round-rod blunt nail 40 exerted on the entire electrochemical device is the largest. When the peel strength $F_1$ between the first bonding layer and the electrode assembly and the peel strength $F_2$ between the second bonding layer and the packaging bag satisfy 50 N/m≤$F_1$≤1000 N/m and 1≤$F_1/F_2$≤10, the packaging bag, the electrode assembly, and the binder form a whole that is consistent in mechanical properties, and generate synergy to effectively improve the resistance-to-compression of the electrochemical device, and in turn, improve the safety performance of the electrochemical device.

In some embodiments of this application, 50 N/m≤$F_2$≤800 N/m. The peel strength $F_2$ between the second bonding layer and the packaging bag may be 50 N/m, 100 N/m, 200 N/m, 300 N/m, 400 N/m, 500 N/m, 600 N/m, 700 N/m, 800 N/m, or a value falling within a range formed by any two thereof. Controlling the peel strength $F_2$ between the second bonding layer and the packaging bag to fall within the above range makes it easier for the packaging bag, the electrode assembly, and the binder to form a whole that is consistent in mechanical properties, and generate synergy to improve the resistance-to-compression of the electrochemical device, and in turn, improve the safety performance of the electrochemical device.

In some embodiments of this application, a thickness of the first bonding layer is 0.5 μm to 50 μm, and a thickness of the second bonding layer is 0.5 μm to 50 μm. For example, the thickness of the first bonding layer may be 0.5 μm, 1 μm, 5 μm, 10 μm, 15 μm, 20 μm, 25 μm, 30 μm, 34 μm, 40 μm, 45 μm, 50 μm, or a value falling within a range formed by any two thereof, and the thickness of the second bonding layer may be 0.5 μm, 1 μm, 5 μm, 10 μm, 15 μm, 20 μm, 25 μm, 30 μm, 34 μm, 40 μm, 45 μm, 50 μm, or a value falling within a range formed by any two thereof. When the thickness of the first bonding layer and/or the second bonding layer is deficient (for example, less than 0.5 μm), the improvement in the safety performance of the electrochemical device is not significant. When the thickness of the first bonding layer and/or the second bonding layer is excessive (for example, greater than 50 μm), the thickness of the first bonding layer basically exerts no effect on the peel strength $F_1$ between the first bonding layer and the electrode assembly, and the thickness of the second bonding layer also basically exerts no effect on the peel strength $F_2$ between the second bonding layer and the packaging bag. However, that the thickness of the first bonding layer and/or the second bonding layer is greater than 50 μm not only impairs uniformity of the overall thickness of the electrochemical device, but also causes waste. Controlling the thicknesses of the first bonding layer and the second bonding layer to fall within the above ranges improves the safety performance of the electrochemical device without affecting other performance indicators (such as thickness uniformity) of the electrochemical device.

In some embodiments of this application, a material of the first bonding layer and a material of the second bonding layer each independently include, but without being limited to, at least one of an acrylic compound, an acrylate compound, a phosphate compound, a polyurethane compound, rosin resin, terpene resin, phenolic resin, petroleum resin, epoxy resin, a vinyl acetate compound, a polyvinyl acetal compound, a polyamide compound, a vulcanized silicone rubber, furan resin, formaldehyde resin, a polyimide compound, urea-formaldehyde resin, an acetate compound, styrene, microcrystalline wax, or poly(styrene-co-$C_2$ to $C_5$ olefin). Preferably, the acrylate compound may include but without being limited to at least one of methyl acrylate, ethyl acrylate, propyl acrylate, butyl acrylate, or 2-ethylhexyl acrylate. The acetate compound may include but without being limited to at least one of methyl acetate, ethyl acetate, propyl acetate, or butyl acetate. The poly(styrene-co-$C_2$ to $C_5$ olefin) may include but without being limited to at least one of poly(styrene-co-isoprene), poly(styrene-block-isoprene-block-styrene), poly(styrene-co-butadiene), or poly (hydrogenated styrene-co-butadiene). With the above compounds selected, the peel strength $F_1$ between the first bonding layer and the electrode assembly and the peel strength $F_2$ between the second bonding layer and the packaging bag can meet the requirements of this application, thereby improving the safety performance of the electrochemical device. The $C_2$ to $C_5$ olefin may be ethylene, propylene, butene, a butene isomer, pentene, or a pentene isomer.

The molecular weights of the materials of the first bonding layer and the second bonding layer are not particularly limited in this application, as long as the objectives of this application can be achieved. For example, the molecular weights of the polyurethane compound, rosin resin, terpene resin, petroleum resin, epoxy resin, polyvinyl acetal compound, polyamide compound, vulcanized silicone rubber, furan resin, formaldehyde resin, polyimide compound, urea-formaldehyde resin, and microcrystalline wax may be 40000 to 60000, 250 to 350, 800 to 1300, 500 to 1000, 400 to 600, 30000 to 50000, 600 to 700, 30000 to 50000, 500 to 1000, 12000 to 17000, 40000 to 50000, 8000 to 15000, and 400 to 600, respectively. Understandably, the above molecular weights are merely examples, and the materials of the first bonding layer and the second bonding layer may be commercially available conventional materials that meet the requirements of this application.

In some embodiments of this application, a thickness of the substrate layer is 1 μm to 50 μm. For example, the thickness of the substrate layer may be 1 μm, 5 μm, 10 μm, 15 μm, 20 μm, 25 μm, 30 μm, 35 μm, 40 μm, 45 μm, 50 μm, or a value falling within a range formed by any two thereof. When the thickness of the substrate layer is deficient (for example, less than 1 μm), the mechanical properties of the substrate layer decline, and the substrate layer is prone to break under the action of an external force, thereby impairing the safety performance of the electrochemical device. When the thickness of the substrate layer is excessive (for example, greater than 50 μm), the overall thickness of the binder increases, thereby impairing uniformity of the overall thickness of the electrochemical device. Controlling the thickness of the substrate layer to fall within the above range improves the safety performance of the electrochemical device without affecting other performance indicators (such as thickness uniformity) of the electrochemical device. Specifically, the tensile strength of the substrate layer may be adjusted by adjusting the material type of the substrate layer and technical parameters (such as annealing temperature and annealing time) in the preparation process.

In some embodiments of this application, the material of the substrate layer includes at least one of aluminum, stainless steel, a titanium alloy, nickel, or mica sheet. The substrate layer made of the above materials possesses good mechanical properties, thereby improving the resistance-to-compression of the electrochemical device, and in turn, improving the safety performance of the electrochemical device.

In some embodiments of this application, the electrode assembly is of a winding structure. The electrode assembly includes a tab. Along a thickness direction of the electrode assembly, the electrode assembly includes a first surface and a second surface. A distance from the tab to the first surface is $L_1$, a distance from the tab to the second surface is $L_2$, and the distances satisfy $L_1/L_2>1$. The first bonding layer adheres to the first surface. The tab is close to the second surface. When the electrochemical device is impacted by an external force, the tab provides a support force for the second surface of the electrode assembly, thereby improving the mechanical strength of the second surface against extrusion. At the same time, the binder adhering to the first surface of the electrode assembly can improve the mechanical strength of the first surface against extrusion. In this way, the obtained electrochemical device as a whole possesses good mechanical strength against extrusion, and the resistance-to-compression of the electrochemical device is improved, thereby improving the safety performance of the electrochemical device. The tab described above is the tab well known in the art, and is not limited in this application.

Figure 7:
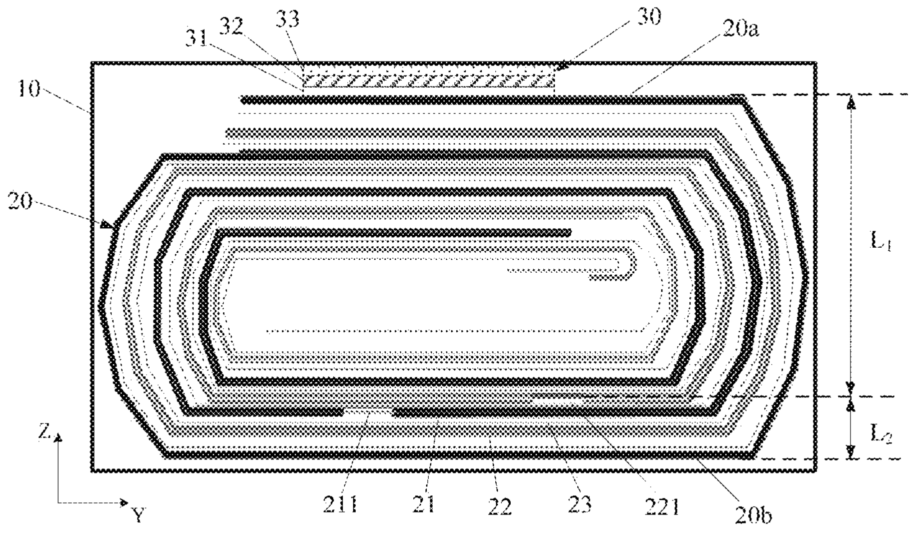
FIG. 7 is a schematic sectional view of an electrochemical device sectioned along a thickness direction of the electrochemical device according to another embodiment of this application.

As an example, as shown in FIG. 7, the electrode assembly 20 is of a winding structure. The electrode assembly 20 includes a positive tab 211 and a negative tab 221. The positive tab 211 is connected to a positive electrode plate 21, and the negative tab 221 is connected to a negative electrode plate 22. Along the thickness direction (Z direction) of the electrode assembly 20, a distance from the negative tab 221 to the first surface 20*a* of the electrode assembly 20 is $L_1$, and a distance from the negative tab 221 to the second surface 20*b* of the electrode assembly 20 is $L_2$. $L_1$ is greater than $L_2$. At the same time, a distance from the positive tab 211 to the first surface 20*a* of the electrode assembly 20 is also greater than a distance from the positive tab 211 to the second surface 20*b* of the electrode assembly 20. The binder 30 of the structure shown in FIG. 3 is affixed onto the first surface 20*a*. This improves the mechanical strength of the first surface against extrusion, and therefore, improves the resistance-to-compression of the electrochemical device as a whole and ensures good safety performance of the resultant electrochemical device. Understandably, the structure of the electrode assembly includes but is not limited to a winding structure, or, the electrode assembly may be of a stacked structure instead.

In some embodiments of this application, the electrode assembly includes a tab and electrode plates. Each of the electrode plates includes a connection region that connects the tab to the electrode plate. Along a thickness direction of the electrode assembly, an orthographic projection of the binder at least partly overlaps an orthographic projection of the connection region. In this way, when the electrochemical device is subjected to an external force, the binder can improve the consistency of the overall mechanical properties of the electrode assembly, and can also protect the tab and reduce the risk of deformation or breakage of the tab, thereby improving the safety performance of the electrochemical device.

Figure 8:
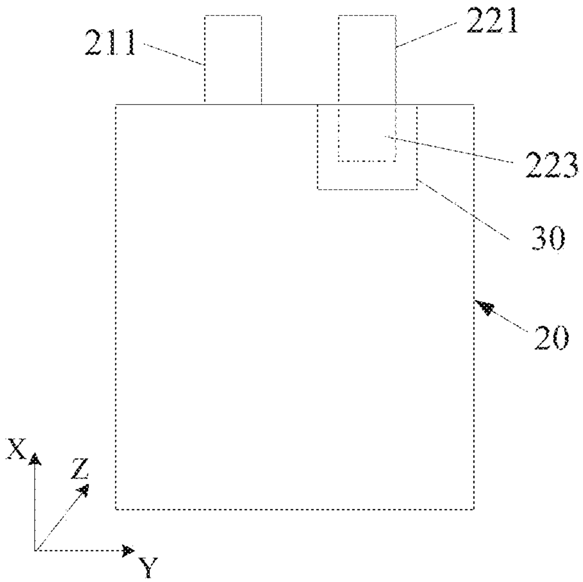
FIG. 8 is a schematic diagram of adhesion of a binder to an electrode assembly according to an embodiment of this application.

In some embodiments of this application, along the thickness direction of the electrode assembly, an area of the orthographic projection of the binder is greater than or equal to an area of the orthographic projection of the connection region. As an example, as shown in FIG. 8, the electrode assembly 20 includes a positive tab 211 and a negative tab 221. The negative tab 221 is connected to the negative electrode plate (not shown in the drawing), and includes a connection region 223. The first bonding layer (not shown in the drawing) of the binder 30 overlays an outer surface of the electrode assembly 20. Along the thickness direction (Z direction) of the electrode assembly 20, the binder 30 overlays the connection region 223. The area of the binder 30 is greater than the area of the connection region 223, that is, the area of the orthographic projection of the binder 30 is greater than the area of the orthographic projection of the connection region 223. In this way, when the electrochemical device is subjected to an external force, the binder can improve the consistency of the overall mechanical properties of the electrode assembly, and can also protect the tab and reduce the risk of deformation or breakage of the tab, thereby improving the safety performance of the electrochemical device. For ease of understanding, referring to FIG. 7, the orthographic projection of the binder 30 means the orthographic projection of the binder 30 on any one of the two surfaces that are of the packaging bag 10 and that are opposite to each other along the Z direction. The orthographic projection of the connection region 223 means the orthographic projection of the connection region 223 on any one of the two surfaces that are of the packaging bag 10 and that are opposite to each other along the Z direction.

In some embodiments of this application, the tab is a negative tab. The negative tab is made of a material including at least one of copper, a copper alloy, nickel, a nickel alloy, or nickel-clad copper. Burrs may exist at the edge of the negative tab and the positive electrode plate. Burrs may be generated when the negative tab is disposed on the negative electrode plate and the positive tab is disposed on the positive electrode plate. However, the negative tab is mostly made of a nickel-containing material, and is usually stronger than the positive tab in terms of mechanical strength (the positive tab is mostly made of an aluminum-containing material). Therefore, the burrs of the negative tab are also stronger, and are more prone to puncture the separator and impair the safety performance of the electrochemical device. The binder adhering to the position shown in FIG. 8 can enhance the mechanical properties of the electrode assembly corresponding to the connection region, and can reduce the deformation of the electrode assembly under the action of an external force, thereby reducing the risk that the burrs of the negative tab puncture the separator, and improving the safety performance of the electrochemical device. The negative tab made of the above materials possesses good mechanical properties, thereby improving the safety performance of the electrochemical device.

The preparation method of the binder is not particularly limited in this application, as long as the objectives of this application can be achieved. For example, the preparation method may include, but without being limited to, the following steps: dissolving a material of the first bonding layer in a solvent to obtain a first bonding layer slurry, dissolving a material of the second bonding layer in a solvent to obtain a second bonding layer slurry, applying the first bonding layer slurry and the second bonding layer slurry onto two surfaces, respectively, of the substrate layer along the thickness direction of the substrate layer, and performing drying to obtain a binder.

The electrochemical device in this application is not particularly limited, and may be any device in which an electrochemical reaction occurs. In some embodiments, the electrochemical device may include, but without being limited to, a lithium metal secondary battery, a lithium-ion secondary battery (lithium-ion battery), a lithium polymer secondary battery, a lithium-ion polymer secondary battery, or the like.

The process of preparing the electrochemical device is well known to a person skilled in the art, and is not particularly limited in this application. For example, the preparation process may include, but without being limited to, the following steps: stacking the positive electrode plate, the separator, and the negative electrode plate in sequence, and performing operations such as winding and folding as required to obtain a winding electrode assembly; affixing the binder, and putting the electrode assembly into a package, injecting the electrolytic solution into the package, and sealing the package to obtain an electrochemical device; or, stacking the positive electrode plate, the separator, and the negative electrode plate in sequence, and then fixing the four corners of the entire stacked structure by use of adhesive tape to obtain a stacked-type electrode assembly, affixing the binder, putting the electrode assembly into a package, injecting the electrolytic solution into the package, and sealing the package to obtain an electrochemical device. In addition, an overcurrent prevention element, a guide plate, and the like may be placed into the package as required, so as to prevent the rise of internal pressure, overcharge, and overdischarge of the electrochemical device. The materials and preparation methods of the positive electrode plate, the separator, the negative electrode plate, and the electrolytic solution are not particularly limited in this application, and may be materials and preparation methods known in the art.

A second aspect of this application provides an electronic device. The electronic device includes the electrochemical device according to any one of the foregoing implementation solutions. Due to the good safety performance of the electrochemical device according to this application, the electronic device according to this application possesses good safety performance.

The electronic device according to this application is not particularly limited, and may be any electronic device known in the prior art. In some embodiments, the electronic device may include, but without being limited to, a notebook computer, pen-inputting computer, mobile computer, e-book player, portable phone, portable fax machine, portable photocopier, portable printer, stereo headset, video recorder, liquid crystal display television set, handheld cleaner, portable CD player, mini CD-ROM, transceiver, electronic notepad, calculator, memory card, portable voice recorder, radio, backup power supply, motor, automobile, motorcycle, power-assisted bicycle, bicycle, lighting appliance, toy, game console, watch, electric tool, flashlight, camera, large household battery, lithium-ion capacitor, and the like.

EMBODIMENTS

The implementations of this application are described below in more detail with reference to embodiments and comparative embodiments. Various tests and evaluations are performed by the following methods. In addition, unless otherwise specified, the word "parts" means parts by mass, and the symbol "%" means a percentage by mass.

Test Methods and Devices

Testing the Tensile Strength:

Cutting a material under test to form a specimen of 15 mm×70 mm in size by using a die cutter. Fixing the specimen between two test fixtures of a GoTech tensile machine to measure the tensile strength of the specimen. Stretching the specimen at a speed of 5 mm/min, with a standard distance between the two fixtures of the tensile machine being 50 mm. Recording the tensile strength and displacement curve. A maximum value of the tensile strength in the displacement curve is the tensile strength of the specimen. The specimen is taken from a substrate layer. During preparation of the specimen, the first bonding layer and/or the second bonding layer disposed on the surface of the substrate layer needs to be removed by using an organic solvent such as alcohol before the test.

Testing $F_1$ and $F_2$:

$F_1$ is a peel strength between the first bonding layer of the binder and the electrode assembly. A process of preparing a specimen includes: removing the binder and an electrode assembly part and a packaging bag part that are close to the binder as a whole, and then scraping off the second bonding layer and the packaging bag part. Subsequently, cutting out a specimen of 20 mm×100 mm in size (if the specimen is not long enough, a piece of paper of equal width may be affixed onto a tensioned end of the specimen to extend the total length of the specimen and facilitate clamping of the specimen at the fixture). The test process includes: fixing a side of the specimen toward the packaging bag onto a test fixture of the GoTech tensile machine by using high-adhesion tape (3M tape) to measure the peel strength. Stretching the specimen at a peel angle of 90° and at a speed of 50 mm/min. The displacement in a single stretching operation is 30 mm, and 10 counterparts of each specimen are tested in parallel, and the test results are averaged out to obtain a final result denoted as $F_1$.

$F_2$ is a peel strength between the second bonding layer of the binder and the packaging bag. A process of preparing a specimen includes: removing the binder and an electrode assembly part and a packaging bag part that are close to the binder as a whole, and then scraping off the first bonding layer and the electrode assembly part. Subsequently, cutting out a specimen of 20 mm×100 mm in size (if the specimen is not long enough, a piece of paper of equal width may be affixed onto a tensioned end of the specimen to extend the total length of the specimen and facilitate clamping of the specimen at the fixture). The test process includes: fixing a side of the specimen toward the electrode assembly onto a test fixture of the GoTech tensile machine by using high-adhesion tape (3M tape) to measure the peel strength. Stretching the specimen at a peel angle of 90° and at a speed of 50 mm/min. The displacement in a single stretching operation is 30 mm, and 10 counterparts of each specimen are tested in parallel, and the test results are averaged out to obtain a final result denoted as $F_2$.

Testing the Blunt Puncture Break Limit:

Fully charging a lithium-ion battery, extruding a geometric center of the lithium-ion battery with a round-rod blunt nail at a speed of 300 N/min by using a triangular rod extruder (model: DKBF-3KH, manufacturer: Dae Kyung), where the diameter of the round-rod blunt nail is 6±0.1 mm, and the length of the round-rod blunt nail is 6.7 cm, the head of the round-rod blunt nail is an isometric hemisphere. Applying a hold-down force to the surface of the lithium-ion battery. Recording the hold-down force and the down displacement. Find a point at which the down displacement changes abruptly, that is, a point at which the lithium-ion battery breaks. Recording the corresponding force at this time as a blunt puncture break limit.

Drop Test:

Leaving a half-charged lithium-ion battery to stand for 2 hours, and then measuring a reference voltage and an internal resistance of the battery before the battery is dropped. Ensuring that the voltage of the lithium-ion battery is 3.94 V to 3.99 V Using compression equipment, putting the lithium-ion battery into a compression fixture, pressing the battery with a 5 kg hold-down bar for 7 seconds, and then leaving the battery to stand for 1 hour and measuring the voltage and internal resistance of the lithium-ion battery. Checking the appearance of the lithium-ion battery for breakage, leakage, or expansion, corrosion, and the like.

Cleaning a drop fixture, putting the lithium-ion battery into the drop fixture, and dropping the lithium-ion battery freely from a height of 1.5 μm with the following 6 parts facing downward respectively in the following order: head→ending→right of head→right of ending→left of head→left of ending, where an angle between the lithium-ion battery and the ground is: 45°±15°. Repeating the drop test for 5 rounds. Checking the battery status after completion of each round of test, and stopping the test if the lithium-ion battery leaks electrolyte, heats up, smokes, catches fire, or incurs a voltage drop by more than 50 mV Leaving the lithium-ion battery to stand at a room temperature for 24 hours after completion of the drop test, and then measuring the voltage and internal resistance of the battery. Determining that the battery passes the test if the battery does not catch fire or leak electrolyte, the electrode assembly connected to the binder is not torn, and the voltage of the lithium-ion battery does not decline for more than 50 mV after the drop test. Testing 10 counterparts of the lithium-ion battery prepared in each embodiment or comparative embodiment, and recording the number of batteries that have passed the test.

Embodiment 1-1

<Preparing a Positive Electrode Plate>

Mixing the positive active material $LiCoO_2$, conductive carbon black as a conductive agent, polyvinylidene difluoride as a binder at a mass ratio of 96:2:2, adding N-methylpyrrolidone (NMP), and stirring the mixture well with a vacuum mixer to obtain a positive slurry, in which a solid content is 70 wt %. Coating one surface of a 12-μm thick positive current collector aluminum foil with the positive slurry evenly, and drying the aluminum foil at 120° C. for 1 hour to obtain a positive electrode plate coated with a positive material layer on a single side. Repeating the foregoing steps on the other surface of the aluminum foil to obtain a positive electrode plate coated with the positive material layer on both sides. Subsequently, performing cold calendering, cutting, and slitting, and drying under vacuum conditions at 120° C. for 1 hour to obtain a positive electrode plate of 74 mm×867 mm in size. Welding the positive tab onto the positive electrode plate. The material of the positive tab is an aluminum foil.

<Preparing a Negative Electrode Plate>

Mixing graphite as a negative active material, styrene butadiene rubber as a binder, and sodium carboxymethyl cellulose as a thickener at a mass ratio of 97.4:1.4:1.2, adding deionized water, and stirring the mixture well with a vacuum mixer to obtain a negative slurry, in which a solid content is 75 wt %. Coating one surface of a 12-μm thick negative current collector copper foil with the negative slurry evenly, and drying the copper foil at 120° C. to obtain a negative electrode coated with a 130-μm thick negative material layer on a single side. Repeating the foregoing steps on the other surface of the copper foil to obtain a negative electrode plate coated with the negative material layer on both sides. Subsequently, performing cold calendering, cutting, and slitting, and drying under vacuum conditions at 120° C. for 1 hour to obtain a negative electrode plate of 78 mm×875 mm in size. Welding the negative tab onto the negative electrode plate. The material of the negative tab is a nickel-clad copper foil.

<Preparing an Electrolytic Solution>

Mixing ethylene carbonate, propylene carbonate, and dimethyl carbonate at a mass ratio of 7:2:1 in an argon atmosphere glovebox in which the moisture content is less than 10 ppm, so as to obtain an organic solvent. Subsequently, adding lithium hexafluorophosphate as a lithium salt into the organic solvent to obtain an electrolytic solution. The concentration of the lithium salt is 1 mol/L.

<Preparing a Separator>

Using a 7-μm thick porous polyethylene film (made by Celgard) as a separator.

<Preparing a Binder>

Preparing the first bonding layer slurry: Mixing butyl acrylate, 2-ethylhexyl acrylate, terpene resin (JL100, made by Shandong Kepu Chemical Co., Ltd.), and styrene at a mass ratio of 60:15:20:5. Adding the mixture into cyclohexane to fully dissolve to obtain a first bonding layer slurry in which a solid content is 30 wt %.

Preparing the second bonding layer slurry: Mixing poly (styrene-block-isoprene-block-styrene) (D1161JSP, made in Japan by Kraton), ethyl acetate, rosin resin (Kraton SYLVALITE RE 100L, made in the United States by Kraton) and microcrystalline wax (80 # microcrystalline wax, made by Sinopec Jingmen Branch) at a mass ratio of 60:5:20:15, and then adding toluene to fully dissolve, so as to obtain a second bonding layer slurry in which a solid content is 30 wt %.

Using a 20-μm thick stainless steel foil-1 as a substrate layer. Applying the first bonding layer slurry onto one surface of the substrate layer, and drying the slurry at 85° C. to obtain a substrate layer coated with the first bonding layer. Subsequently, applying the second bonding layer slurry onto the other surface of the substrate layer, and drying the slurry at 85° C. to obtain a binder containing the first bonding layer, the substrate layer, and the second bonding layer that are stacked in sequence. The thickness of the first bonding layer is 5 μm, the thickness of the second bonding layer is 5 μm, and the tensile strength of the substrate layer is 100 MPa.

<Preparing a Lithium-Ion Battery>

Stacking the above-prepared positive electrode plate, separator, and negative electrode plate in sequence in such a way that the separator is located between the positive electrode plate and the negative electrode plate to serve a function of separation, and winding the stacked structure to obtain an electrode assembly. Subsequently, affixing the bonding layer of the binder prepared above onto the outer surface of the electrode assembly at a position shown in FIG. 8. Afterward, putting the electrode assembly into an aluminum plastic film package, drying the packaged electrode assembly, and then injecting the electrolytic solution. Performing steps such as vacuum sealing, static standing, chemical formation, degassing, and edge trimming to obtain a lithium-ion battery.

Embodiment 1-2 to Embodiment 1-5

Identical to Embodiment 1-1 except that the relevant preparation parameters are adjusted according to Table 1.

Embodiment 2-1 to Embodiment 2-7

Identical to Embodiment 1-1 except that the relevant preparation parameters are adjusted according to Table 2.

Comparative Embodiment 1

Identical to Embodiment 1-1 except that no binder is disposed.

Comparative Embodiment 2 to Comparative Embodiment 4

Identical to Embodiment 1-1 except that the relevant preparation parameters are adjusted according to Table 1.

Comparative Embodiment 5 and Comparative Embodiment 6

Identical to Embodiment 1-1 except that the relevant preparation parameters are adjusted according to Table 2.

Table 1 to Table 2 show the relevant preparation parameters and test results of the embodiments and comparative embodiments.

TABLE 1

| | Material of first bonding layer | Mass ratio between ingredients of first bonding layer | Material of second bonding layer | Mass ratio between ingredients of second bonding layer | $F_1$ (N/m) | $F_2$ (N/m) | $F_1/F_2$ | Blunt puncture break limit (N) | Number passing the drop test (pcs) |
|---|---|---|---|---|---|---|---|---|---|
| Embodiment 1-1 | Butyl acrylate + 2-ethylhexyl acrylate + terpene resin + styrene | 40:15:10:35 | Poly(styrene-block-isoprene-block-styrene) + ethyl acetate + rosin resin + microcrystalline wax | 60:5:20:15 | 500 | 300 | 1.67 | 1700 | 8 |
| Embodiment 1-2 | Butyl acrylate + 2-ethylhexyl acrylate + terpene resin + styrene | 20:10:5:65 | Poly(styrene-block-isoprene-block -styrene) + ethyl acetate + rosin resin microcrystalline wax | 30:5:20:45 | 50 | 50 | 1 | 1721 | 7 |
| Embodiment 1-3 | Butyl acrylate + 2-ethylhexyl acrylate + terpene resin + styrene | 40:15:10:35 | Poly(styrene-block-isoprene-block-styrene) + ethyl acetate + rosin resin microcrystalline wax | 50:5:20:25 | 500 | 200 | 2.5 | 1743 | 6 |
| Embodiment 1-4 | Butyl acrylate + 2-ethylhexyl acrylate + terpene resin + acrylic acid | 55:15:15:15 | Poly(styrene-block-isoprene-block-styrene) + ethyl acetate + rosin resin + microcrystalline wax | 40:5:15:40 | 1000 | 100 | 10 | 1817 | 7 |
| Embodiment 1-5 | Butyl acrylate + 2-ethylhexyl acrylate + terpene resin + styrene | 50:15:15:20 | Poly(styrene-block-isoprene-block-styrene) + ethyl acetate + rosin resin + microcrystalline wax | 90:2:3:5 | 800 | 800 | 1 | 1736 | 8 |
| Comparative Embodiment 1 | / | / | / | / | / | / | / | 1400 | 0 |
| Comparative Embodiment 2 | Butyl acrylate + 2-ethylhexyl acrylate + terpene resin + styrene | 35:10:10:45 | Poly(styrene-block-isoprene-block-styrene) + ethyl acetate + rosin resin + microcrystalline wax | 90:2:3:5 | 200 | 800 | 0.25 | 1450 | 1 |

TABLE 1-continued

| | Material of first bonding layer | Mass ratio between ingredients of first bonding layer | Material of second bonding layer | Mass ratio between ingredients of second bonding layer | $F_1$ (N/m) | $F_2$ (N/m) | $F_1/F_2$ | Blunt puncture break limit (N) | Number passing the drop test (pcs) |
|---|---|---|---|---|---|---|---|---|---|
| Comparative Embodiment 3 | Butyl acrylate + 2-ethylhexyl acrylate + terpene resin + acrylic acid | 60:5:20:15 | Poly(styrene-block-isoprene-block-styrene) + ethyl acetate + rosin resin + microcrystalline wax | 40:5:15:40 | 1500 | 100 | 15 | 1490 | 1 |
| Comparative Embodiment 4 | Butyl acrylate + 2-ethylhexyl acrylate + terpene resin + styrene | 13:7:5:75 | Poly(styrene-block-isoprene-block-styrene) + ethyl acetate + rosin resin + microcrystalline wax | 20:5:20:55 | 30 | 30 | 1 | 1430 | 1 |

Note:
"/" in Table 1 indicates nonexistence of the corresponding parameter.

As can be seen from Embodiment 1-1 to Embodiment 1-5 and Comparative Embodiment 1, the binder according to this application disposed in the lithium-ion battery improves the blunt puncture break limit and the number passing the drop test of the lithium-ion battery, thereby improving the safety performance of the lithium-ion battery. As can be seen from Embodiment 1-1 to Embodiment 1-5 and Comparative Embodiment 2 to Comparative Embodiment 4, when the peel strength $F_1$ between the first bonding layer and the electrode assembly and the value of the $F_1/F_2$ ratio fall within the ranges specified herein, the resulting lithium-ion battery is of higher safety performance. The peel strength $F_2$ between the second bonding layer and the packaging bag and the materials of the first bonding layer and the second bonding layer generally affect the safety performance of lithium-ion battery. As can be seen from Embodiment 1-1 to Embodiment 1-5, when the peel strength $F_2$ between the second bonding layer and the packaging bag and the materials of the first bonding layer and the second bonding layer fall within the ranges specified herein, the resulting lithium-ion battery is of good safety performance.

TABLE 2

| | Thickness of first bonding layer (μm) | Thickness of second bonding layer (μm) | Thickness of substrate layer (μm) | Tensile strength of substrate layer (MPa) | $F_1$ (N/m) | $F_2$ (N/m) | Blunt puncture break limit (N) | Number passing the drop test (pcs) |
|---|---|---|---|---|---|---|---|---|
| Embodiment 1-1 | 5 | 5 | 20 | 500 | 500 | 300 | 1700 | 8 |
| Embodiment 2-1 | 0.5 | 5 | 20 | 500 | 300 | 300 | 1680 | 7 |
| Embodiment 2-2 | 50 | 5 | 20 | 500 | 1000 | 300 | 1739 | 9 |
| Embodiment 2-3 | 5 | 0.5 | 20 | 500 | 500 | 100 | 1711 | 7 |
| Embodiment 2-4 | 5 | 50 | 20 | 500 | 500 | 500 | 1749 | 9 |
| Embodiment 2-5 | 5 | 5 | 1 | 100 | 500 | 300 | 1603 | 8 |
| Embodiment 2-6 | 5 | 5 | 35 | 1200 | 500 | 300 | 2300 | 8 |
| Embodiment 2-7 | 5 | 5 | 50 | 1900 | 500 | 300 | 2751 | 8 |
| Comparative Embodiment 5 | 5 | 5 | 0.5 | 50 | 500 | 300 | 1401 | 7 |

TABLE 2-continued

| | Thickness of first bonding layer (μm) | Thickness of second bonding layer (μm) | Thickness of substrate layer (μm) | Tensile strength of substrate layer (MPa) | $F_1$ (N/m) | $F_2$ (N/m) | Blunt puncture break limit (N) | Number passing the drop test (pcs) |
|---|---|---|---|---|---|---|---|---|
| Comparative Embodiment 6 | 5 | 5 | 20 | 2200 | 500 | 300 | 1500 | 7 |

Note:
The material of the substrate layer in Comparative Embodiment 6 in Table 2 is a stainless steel foil-2. The stainless steel foil-1 and the stainless steel foil-2 are intended to adjust the tensile strength of the substrate layer according to Table 2 by adjusting the annealing temperature and the annealing time of a stainless steel foil during the preparation.

As can be seen from Embodiment 1-1, Embodiment 2-1 to Embodiment 2-7, Comparative Embodiment 5, and Comparative Embodiment 6, when the tensile strength of the substrate layer falls within the range specified herein, the resulting lithium-ion battery possesses a higher blunt puncture break limit and higher safety performance. The thicknesses of the first bonding layer, the second bonding layer, and the substrate layer and the tensile strength of the substrate layer generally affect the performance of the lithium-ion battery. As can be seen from Embodiment 1-1 and Embodiment 2-1 to Embodiment 2-7, when the thicknesses of the first bonding layer, the second bonding layer and the substrate layer and the tensile strength of the substrate layer fall within the ranges specified herein, the resulting lithium-ion battery is of good safety performance.

It is hereby noted that the lithium-ion batteries in Embodiment 1-1 to Embodiment 1-5 and Embodiment 2-1 to Embodiment 2-7 are merely examples, without imposing any limitation on this application.

It is hereby noted that the relational terms such as "first" and "second" herein are merely intended to differentiate an entity from another, but do not require or imply any actual relationship or sequence between the entities. Moreover, the terms "include", "comprise", and any variation thereof are intended to cover a non-exclusive inclusion relationship in which a process, method, object, or device that includes or comprises a series of elements not only includes such elements, but also includes other elements not expressly recited or also includes inherent elements of the process, method, object, or device.

Embodiments in this specification are all described in a correlative manner. For the same or similar part in one embodiment, reference may be made to another embodiment, and each embodiment focuses on differences from other embodiments.

What is described above is merely exemplary embodiments of this application, but is not intended to limit this application. Any modifications, equivalent replacements, improvements, and the like made without departing from the spirit and principles of this application still fall within the protection scope of this application.

What is claimed is:

1. An electrochemical device, comprising a packaging bag, an electrode assembly, and a binder;

wherein the electrode assembly is disposed in the packaging bag, the binder is configured to bond the electrode assembly to the packaging bag;

the binder comprises a first bonding layer, a substrate layer, and a second bonding layer stacked in sequence; the first bonding layer adheres to a surface of the electrode assembly, the second bonding layer adheres to a surface of the packaging bag;

a peel strength between the first bonding layer and the electrode assembly is $F_1$, a peel strength between the second bonding layer and the packaging bag is $F_2$, 50 N/m≤$F_1$≤1000 N/m and 1.67≤$F_1/F_2$≤10, and a tensile strength of the substrate layer is 100 MPa to 2000 MPa.

2. The electrochemical device according to claim 1, wherein 50 N/m≤$F_2$≤800 N/m.

3. The electrochemical device according to claim 1, wherein a thickness of the first bonding layer is 0.5 μm to 50 μm, and a thickness of the second bonding layer is 0.5 μm to 50 μm.

4. The electrochemical device according to claim 1, wherein a material of the first bonding layer and a material of the second bonding layer each independently comprise at least one of an acrylic compound, an acrylate compound, a phosphate compound, a polyurethane compound, rosin resin, terpene resin, phenolic resin, petroleum resin, epoxy resin, a vinyl acetate compound, a polyvinyl acetal compound, a polyamide compound, a vulcanized silicone rubber, furan resin, formaldehyde resin, a polyimide compound, urea-formaldehyde resin, an acetate compound, styrene, microcrystalline wax, or poly(styrene-co-$C_2$ to $C_5$ olefin).

5. The electrochemical device according to claim 1, wherein a thickness of the substrate layer is 1 μm to 50 μm.

6. The electrochemical device according to claim 1, wherein a material of the substrate layer comprises at least one of aluminum, stainless steel, a titanium alloy, nickel, or mica sheet.

7. The electrochemical device according to claim 1, wherein the electrode assembly is of a winding structure; the electrode assembly comprises a tab;

along a thickness direction of the electrode assembly, the electrode assembly comprises a first surface and a second surface;

a distance from the tab to the first surface is $L_1$, a distance from the tab to the second surface is $L_2$, and $L_1/L_2>1$; and the first bonding layer adheres to the first surface.

8. The electrochemical device according to claim 1, wherein the electrode assembly comprises a tab and an electrode plate, the electrode plate comprises a connection region connecting the tab to the electrode plate, and along a thickness direction of the electrode assembly, an orthographic projection of the binder at least partly overlaps an orthographic projection of the connection region.

9. The electrochemical device according to claim 8, wherein along the thickness direction of the electrode assembly, an area of the orthographic projection of the binder is greater than or equal to an area of the orthographic projection of the connection region.

10. The electrochemical device according to claim 8, wherein the tab is a negative tab; and the negative tab is made of a material comprising at least one of copper, a copper alloy, nickel, a nickel alloy, or nickel-clad copper.

11. An electronic device, comprising an electrochemical device, wherein the electrochemical device comprises:

a packaging bag, an electrode assembly, and a binder;

wherein the electrode assembly is disposed in the packaging bag, the binder is configured to bond the electrode assembly to the packaging bag;

the binder comprises a first bonding layer, a substrate layer, and a second bonding layer stacked in sequence;

the first bonding layer adheres to a surface of the electrode assembly, the second bonding layer adheres to a surface of the packaging bag;

a peel strength between the first bonding layer and the electrode assembly is $F_1$, a peel strength between the second bonding layer and the packaging bag is $F_2$, 50 N/m≤$F_1$≤1000 N/m and 1.67≤$F_1/F_2$≤10, and a tensile strength of the substrate layer is 100 MPa to 2000 MPa.

12. The electronic device according to claim 11, wherein 50 N/m≤$F_2$≤800 N/m.

13. The electronic device according to claim 11, wherein a thickness of the first bonding layer is 0.5 μm to 50 μm, and a thickness of the second bonding layer is 0.5 μm to 50 μm.

14. The electronic device according to claim 11, wherein a material of the first bonding layer and a material of the second bonding layer each independently comprise at least one of an acrylic compound, an acrylate compound, a phosphate compound, a polyurethane compound, rosin resin, terpene resin, phenolic resin, petroleum resin, epoxy resin, a vinyl acetate compound, a polyvinyl acetal compound, a polyamide compound, a vulcanized silicone rubber, furan resin, formaldehyde resin, a polyimide compound, urea-formaldehyde resin, an acetate compound, styrene, microcrystalline wax, or poly(styrene-co-$C_2$ to $C_5$ olefin).

15. The electronic device according to claim 11, wherein a thickness of the substrate layer is 1 μm to 50 μm.

16. The electronic device according to claim 11, wherein a material of the substrate layer comprises at least one of aluminum, stainless steel, a titanium alloy, nickel, or mica sheet.

17. The electronic device according to claim 11, wherein the electrode assembly is of a winding structure; the electrode assembly comprises a tab;

along a thickness direction of the electrode assembly, the electrode assembly comprises a first surface and a second surface;

a distance from the tab to the first surface is $L_1$, a distance from the tab to the second surface is $L_2$, and $L_1/L_2>1$; and the first bonding layer adheres to the first surface.

18. The electronic device according to claim 11, wherein the electrode assembly comprises a tab and an electrode plate, the electrode plate comprises a connection region connecting the tab to the electrode plate, and along a thickness direction of the electrode assembly, an orthographic projection of the binder at least partly overlaps an orthographic projection of the connection region.

19. The electronic device according to claim 18, wherein along the thickness direction of the electrode assembly, an area of the orthographic projection of the binder is greater than or equal to an area of the orthographic projection of the connection region.

20. The electronic device according to claim 18, wherein the tab is a negative tab; and the negative tab is made of a material comprising at least one of copper, a copper alloy, nickel, a nickel alloy, or nickel-clad copper.

* * * * *